Dec. 17, 1968  R. B. SIVYER  3,416,571
HEATER FITTINGS
Filed Dec. 24, 1964
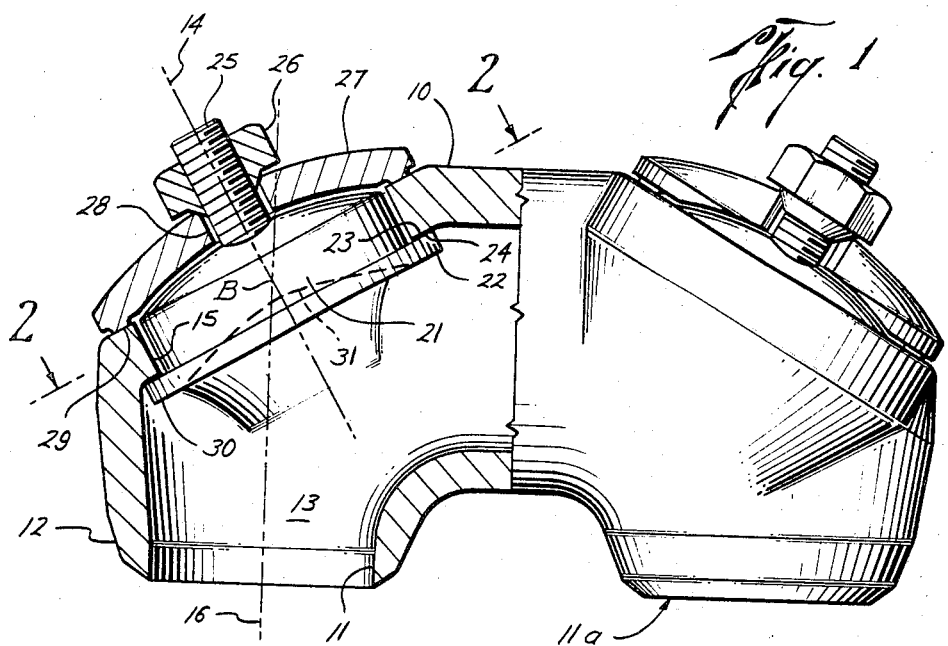
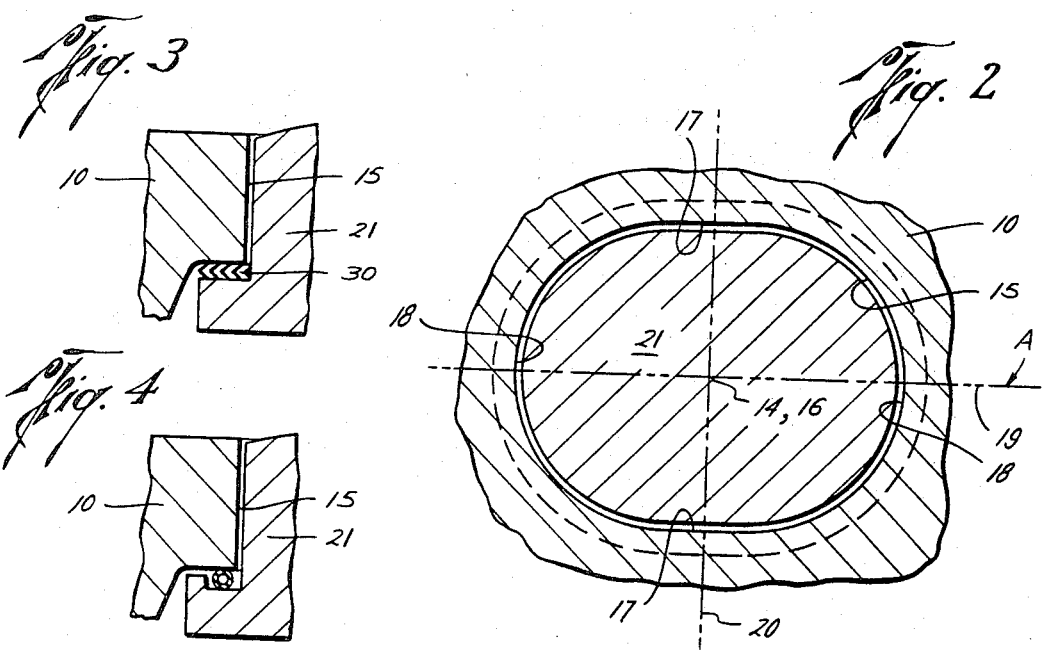
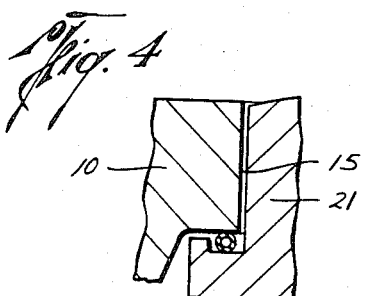
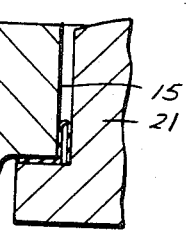
Robert B. Sivyer
INVENTOR.

United States Patent Office 3,416,571
Patented Dec. 17, 1968

3,416,571
HEATER FITTINGS
Robert B. Sivyer, 1314 Beutel, Houston,
Tex. 77055
Filed Dec. 24, 1964, Ser. No. 421,019
4 Claims. (Cl. 138—92)

ABSTRACT OF THE DISCLOSURE

This disclosure relates to heater fittings, particularly, pipe fittings or couplings, manifolds, 180° return bends and elbows. A curved body is provided with a racetrack shaped opening disposed so as to provide a cylindrical continuation of an internal passageway. An inner sealing surface is arranged perpendicular to the central axis of the opening for engagement with a flanged closure member. A cover and the outer surface are similarly arranged.

---

This invention relates to heater fittings, and more particularly, to pipe fittings or couplings, manifolds, 180° return bends and elbows which are normally welded or rolled onto pipe or tubes and provided with access openings.

In a process heater, hydrocarbon fluids are passed through a pipe system which is externally heated. The heat imparted to the liquids assists in subsequent processing of the fluids where various hydrocarbon products are obtained. Because of high temperatures involved in the heating and the nature of the product passing through the pipe system, residual petroleum products called "coke" are deposited in the pipe system. This build-up of "coke" will cause the pipes to ultimately overheat and fail. Maintenance on such pipe systems includes periodic cleaning by a steam-air decoking process or mechanical scraper devices passed through the pipes. Because the pipe system normally is comprised of welded joints throughout, it is customary to provide an access opening in all or selected fittings through which inspection and the cleaning process can be conducted. The access opening is normally closed by a screw-driven exterior closure member. Because of the pressure and temperatures involved, metal-to-metal seals are used. A fitting provided with such an access device is expensive to manufacture because of the necessity of providing sufficient external retaining structure to assure a loading in excess of the internal pressures.

It is an object of the present invention to provide new and improved pipe fittings with an out-of-round or noncircular access opening and complementary closure member.

It is a further object of the present invention to provide new and improved access openings for pipe fittings which are adapted for universal entry.

A still further object of the present invention is to provide new and improved pipe fittings for high temperature and high pressure applications.

Referring now to FIG. 1, a U type of fitting 10 is illustrated. Fitting 10 has flow openings 11, 11a with external tapered surfaces 12 for butt-welded connection to piping (not shown). Fitting 10 has an internal flow passageway 13 extending between openings 11, 11a with a U configuration.

The invention includes an out-of-round access opening 15. A central axis 14 of the access opening 15 intersects the central axis 16 of opening 11. Axes 16 and 14 define a plane A (FIG. 2). Opening 15 has a racetrack shape with parallel sides 17 and semi-circular ends 18. A major axis 19 of opening 15 lies in plane A perpendicular to axis 14 and a minor axis 20 of opening 15 is perpendicular to the major axis 19.

Apparatus in accord with the present invention includes an angular pipe fitting provided with an entry opening adapted for coupling to a pipe and an access opening provided with an interior removable plug. The access opening is disposed on the curvature of the fitting and made out-of-round so that the entry opening, if extended, would be circumscribed by the access opening. The plug is made complementary to the access opening and insertable through the opening to provide an inverted seal.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 illustrates a U bend fitting incorporating the present invention;

FIG. 2 is a view taken along line 2—2 of FIG. 1; and

FIGS. 3–5 are partial views illustrating various embodiments of seals or gaskets which can be used with the present invention.

The out-of-round shape of opening 15 permits insertion of a plug 21 having a portion thereof with a peripheral configuration complementary to the opening 15. The plug 21 has a flange or lip portion 22 with an upper surface 23 which bears against a complementary sealing surface 24 formed in the fitting. The body portion of the plug 21 fits within opening 15 and has an outwardly extending stud portion 25 which receives a nut 26.

A cover plate 27 with a central opening 28 for reception over the stud has a bearing portion 29 about its periphery to engage peripheral points of the fitting located about the opening.

The inner surface 20 of the plug has a curved recess 31 (shown in dashed line) to provide for curvature continuity of the passageway 13 through the turn of the fitting and thereby minimize wear on the plug.

The central axis 14 of the access opening 15 and central axis 16 of opening 11 intersect at a point B which is midway of the wall thickness of the fitting. The diameter of the minor axis 20 of opening corresponds generally to the diameter of the opening 11. The major axis 19 of the opening 15 is sized so that, viewed along axis 16, the opening appears circular because the access opening circumscribes an imaginary cylindrical extension of the opening 11.

The angle between axis 16 and axis 14 is illustrated as 30 degrees. The angle can, of course, be varied to suit the size of the fitting and the hole size desired. The opening 15 disposed at an angle relative to the axis of the entrance opening 11 permits insertion of a cylindrical cleaning or inspection tool with a diameter almost equal to the diameter of opening 11 despite the fact that the opening is at an angle. The out-of-round opening 15 also permits insertion of a plug 21 in the opening to position the flange 22 in sealing relation to the sealing surface on the fitting. The stud portion 25 is, of course, proportioned to permit insertion of the plug 21. Once the plug is positioned in place, the cover 27 can be positioned on the exterior of the fitting and the plug 21 drawn up tightly to the fitting by means of the nut 26. It will be readily appreciated that fluid pressures within the fitting act on the plug 22 tending to enhance the seal between the plug and fitting.

The fitting and plug may be constructed of an alloy steel for high temperature applications. For these operations and others, it may be desired to use, in preference to a metal-to-metal seal, a compressible metal gasket 30 as shown in FIG. 3. In FIG. 4, a hollow metal O ring is illustrated while a U type seal is illustrated in FIG. 5.

The advantages of the present invention should be apparent. They include: (1) insertion of a closure member through the opening to provide an inner sealing member, (2) arrangement of access opening relative to the entry opening to permit easy entry of inspection and pipe cleaning equipment, (3) most significantly, highly decreased costs of manufacture, and (4) ease of opening.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A pipe fitting comprising; a body having a curved passageway with an entry opening and a first central axis, said body having an access opening along said curved passageway with a second central axis intersecting said first central axis and defining with said first central axis a common plane, said access opening having a non-circular shape about said second axis arranged and aligned relative to said entry opening so as to substantially circumscribe an imaginary cylindrical extension of said entry opening along said first central axis, said body further having an inner sealing surface disposed about said access opening on a plane generally perpendicular to said second central axis, and means for closing said access opening including a member having a flanged portion for sealing relative to said sealing surface.

2. The apparatus of claim 1 and further including an outer bearing surface on said body on a plane parallel to the plane of said sealing surface, said closing means including a cover adapted to engage said outer bearing surface.

3. A pipe fitting comprising; a body having a curved passageway with an entry opening and a first central axis, said body having an access opening along said curved passageway with a second central axis intersecting said first central axis and defining with said first central axis a common plane, said access opening having parallel sides and semi-circular ends and aligned relative to said entry opening so as to substantially circumscribe an imaginary cylindrical extension of said entry opening along said first central axis, said body further having an inner sealing surface disposed about said access opening on a plane generally perpendicular to said second central axis, and means for closing said access opening including a member having a flanged portion for sealing engagement with said sealing surface.

4. The apparatus of claim 3 and further including an outer bearing surface on said body on a plane parallel to the plane of said sealing surface, said closing means including a cover adapted to engage said outer bearing surface.

References Cited

UNITED STATES PATENTS

| 1,349,510 | 8/1920 | Jochumsen | 220—25 |
| 1,944,290 | 1/1934 | Levy | 285—157 X |
| 2,955,851 | 10/1960 | Scott | 285—127 |
| 1,201,291 | 10/1916 | Harrod | 285—124 |
| 1,752,332 | 4/1929 | Fantz | 285—127 |

FOREIGN PATENTS

| 424,388 | 2/1935 | Great Britain. |
| 913,333 | 12/1962 | Great Britain. |

EDWARD C. ALLEN, *Primary Examiner.*

THOMAS F. CALLAGHAN, *Assistant Examiner.*

U.S. Cl. X.R.

285—121, 157; 220—25